US006966574B1

(12) United States Patent
Dahl

(10) Patent No.: US 6,966,574 B1
(45) Date of Patent: Nov. 22, 2005

(54) MULTI-FUNCTIONAL CONVERTIBLE TRANSPORT CART

(76) Inventor: Gary-Michael Dahl, 8300 Sands Point Dr., #903, Houston, TX (US) 77036

( * ) Notice: Subject to any disclaimer, the term of this patent is extended or adjusted under 35 U.S.C. 154(b) by 0 days.

(21) Appl. No.: 10/614,725

(22) Filed: Jul. 7, 2003

Related U.S. Application Data

(63) Continuation-in-part of application No. 09/776,187, filed on Feb. 2, 2001, now abandoned.

(51) Int. Cl.[7] .................................................. B62B 3/02
(52) U.S. Cl. ................ 280/651; 280/47.18; 280/47.29; 280/47.34
(58) Field of Search .................. 301/113; 280/87.021, 280/47.18, 47.19, 47.27, 47.28, 655, 655.1, 280/654, 5.22, 5.24

(56) References Cited

U.S. PATENT DOCUMENTS 34,015 A * 12/1861 Scheeper .................... 301/113
819,434 A * 5/1906 Johnston ..................... 301/113
895,842 A * 8/1908 Chambers, Jr. ............. 411/213
1,618,496 A * 2/1927 Ware .......................... 301/5.7
1,697,485 A * 1/1929 Ware .......................... 301/5.7
4,201,744 A * 5/1980 Makinson ................... 264/250
4,531,752 A * 7/1985 Diener .................... 280/47.18
4,917,442 A * 4/1990 Johnson ...................... 301/113
5,228,716 A * 7/1993 Dahl .......................... 280/651
5,476,282 A * 12/1995 Dahl .......................... 280/651
5,623,829 A * 4/1997 Nutter et al. .................... 62/5
5,655,785 A * 8/1997 Lee ....................... 280/11.223
6,220,611 B1 * 4/2001 Shapiro ................... 280/47.34

* cited by examiner

*Primary Examiner*—Christopher P. Ellis
*Assistant Examiner*—Kelly E Campbell
(74) *Attorney, Agent, or Firm*—John K. Buche

(57) ABSTRACT

A multi-functional cart for transporting objects including a frame, a first handle connected to the frame adjacent a first end of the frame, a second handle connected to the frame adjacent a second end of the frame, a first pair of wheels connected to the frame adjacent the first end of the frame and a second pair of wheels connected to the frame adjacent the second end of the frame. The handles are different sizes and are selectively movable between perpendicular to the frame and coplanar to the frame. The frame has a generally rectangular configuration and includes frame members which are telescopically connected to each other. The multi-functional cart transforms into eight or more configurations.

13 Claims, 4 Drawing Sheets

MULTI-FUNCTIONAL CONVERTIBLE TRANSPORT CART

RELATED U.S. APPLICATIONS

The present application is a continuation-in-part of U.S. patent application Ser. No. 09/776,187, filed on Feb. 2, 2001 now abandoned, and entitled "LIGHTWEIGHT CONVERTIBLE TRANSPORT CART".

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to hand trucks, dollies, and other land vehicles. More particularly, the present invention relates to lightweight, telescoping foldable and convertible hand trucks and/or platform carts which are used for transporting objects.

BACKGROUND OF THE INVENTION

Many improvements have been made in the area of hand trucks and dollies for material handling. However, none of these improvements have efficiently and effectively addressed the needs of professional musicians. Professional musicians are required to transport wide varieties of musical equipment in numerous shapes and sizes over various terrains and changing environments while traveling to and from performance sites. Some of these performance sites include outdoor concerts stages, indoor concert halls, wedding reception halls, churches, cruise ships, high-rise office buildings, outdoor restaurants, and larger indoor clubs. Cart and equipment are in turn transported by minivans, vans, airlines, busses, trains, ships, and smaller cars with relatively little cargo capacity. Due to the virtual explosion in technology over the last ten years regarding PA systems, electronic keyboards, acoustic and digital drums, multiple guitars, effects, etc., bands require more equipment than ever before. In addition, the era of two to three month band engagement at a single location is much less frequent than in the past. Musicians are now required to move equipment from gig to gig much more often than previously. This has made transporting equipment a major concern creating a need for very specialized high-performance carts and dollies. In short, musicians needed a cart that would carry huge amounts of gear, set up extremely fast, and fold small for storage. The present inventor has experienced considerable success with the sale of convertible transport carts as identified in U.S. Pat. Nos. 5,228,716 and 5,476,282. However, no cart designs have adequately addressed the specific, multifaceted and very unique needs of professional guitarists and bassists.

Guitarists and bassists required a small 4-wheel expandable cart with two foldable sides that could meet airline overhead baggage restrictions, have a cargo capacity of about 350 lbs/24 cubic feet of cargo, transform into eight configurations, weigh less than 18 lbs, and function as an amplifier stand. In addition, one foldable side must rotate and lock in a vertical position and be a minimum height of approximately 31" from the floor whereby the user could comfortably push and steer the cart without having to bend over too far. The other shorter foldable side must have a maximum length of approximately 18" to function effectively as a 2-wheel handtruck when moving amplifiers and other bulky equipment. The same 18" side was also necessary to allow long and relatively fragile guitar/bass cases to overhang the end of the cart while riding atop amps, effects cases, and other gear during transport. Furthermore, the cart wheels and casters must absorb shock to protect delicate tube amps, roll quietly over rough surfaces, and be lightweight. The cart has to be extremely rugged to withstand years of rough professional use. The cart must be usable on a more limited basis by other instrumentalists as well. Finally, the cart must be economically priced. This was a formidable design task to say the least.

Similar limitations and problems plague all previous cart designs for this application. If the cart has a big load capacity then its storage size is too big. Conversely, if the storage size is small then the cargo capacity is too small. The prior art Cohn cart is much too bulky, too heavy, does not fold down small, and was designed for transporting large appliances. The prior art Foss cart folds in the middle of the frame and is not structurally strong or versatile enough. The prior art Hill truck does not fold flat enough and is too slow to set up. The prior art Gier truck only has two wheels and is of insufficient cubic load capacity to suit the needs of guitarists and all their gear. The prior art Doheny truck does not have a retractable frame bed and one side does not fold own therefore occupying too far much storage space. 2-wheel luggage carts do fold down for portability, but their cubic foot load capacity is too small to easily transport all of a guitarists equipment in one trip. Conventional convertible trucks commonly found in hardware stores (also called dual trucks), convert from a 2-wheel hand truck configuration to a 4-wheel platform truck configuration. They typically expand to approximately 2 times their storage size or, rather, have a frame expanded size to storage size ratio of approximately 2:1 when measured at the widest points.

The prior art by the present inventor, as described in U.S. Pat. Nos. 5,228,716 and 5,476,282 is too bulky to store in airline overheads, too heavy for guitarists, does not transform into a wide variety of configurations, and is too big and obtrusive for stage use. The prior art carts will only transform effectively into two configurations. Furthermore, the foldable sides on prior art carts are too long to effectively use as a 2-wheel handtruck, cannot be shortened less than 30", and are not replaceable.

The present invention has many advantages over 2-wheel and 4-wheel conventional carts. Its frame expands to over six times its storage size or approximately a 6:1 ratio making it extraordinarily efficient as a versatile, large capacity cart with small storage size. It has the same cubic foot load capacity of a conventional dual truck but folds to ⅙ of the storage size of a dual truck. It folds down like a industrial size luggage cart but carries a much greater cubic foot load capacity. It is lighter in weight than any other comparable 4-wheel cart and much more versatile. In addition, it will fit in the overhead baggage compartment of most major airlines. The frame can be instantly lengthened, shortened and manipulated into eight different configurations replacing the features of eight different cart types without disassembly. It also functions as an on-stage amplifier stand.

It must be noted that since this invention functions dynamically as a cohesive whole, changing any one design parameter usually requires a chain of other modifications to allow the cart to function correctly. Changing the toe plate length or frame length a few inches on a typical two-wheel hand truck has little effect on its basic function. Changing the foldable side length an inch, lengthening a clevis pin, or using a different size wingbolt on the prior art cart requires the modification of possibly ten different parameters which may or may not allow the cart to function correctly. Reducing the storage size and weight of the cart resulted in numerous unexpected engineering challenges that had to be overcome. However, once these problems were overcome, it yielded many new and unexpected features and advantages. The following summarizes the challenges presented, design changes, advantages of those changes, and problems associated with solving them.

Airline overhead baggage size restrictions limited the cumulative dimensions (length+width+height) from approximately 45" to 50" depending on the airline company and type of airplane. With the minimum ergonomically effective height of the raised (steering) side determined at approximately 31", the other dimensions of the cart had to be absolutely minimized to meet these restrictions. Research testing revealed that the main frame bed width had to be a minimum of approximately 11" wide to prevent guitar and bass amps from falling off during transport. The problem was that in order to pass the airline restrictions, the overall side to side wheelbase had to be absolutely minimized by designing an entirely new rear wheel/hub system that did not protrude far from the sides of the frame. The wheel treads needed to be at least 1.50" in width to keep the cart from sinking into dirt when fully loaded. A wheel system was developed comprising an offset polymer hub having concentric holes bonded to a dome shaped soft tread with approximately uniform 4 mm tread thickness whereby the wheel could be positioned significantly closer to the mainframe than conventional wheels. This unique wheel system reduced the side-to-side wheelbase dimensions while retaining the frame bed width, and was lightweight. The new wheels of the present invention only protruded 1 ⅝" form each side of the main frame tubes significantly reducing the side to side wheelbase by ¾" thereby helping the cart meet airline overhead restrictions. The wheel system was very different than domed shaped roller blade wheels which use a tread that extends far up the side wall and symmetrical hubs that are roughly the same width side to side as the tread itself to accommodate the leaning motion of roller blade skaters. In addition, the urethane tread used by rollerblade wheels would have been much to heavy and costly for wheels larger than 4" diameter. The side to side width of the wheel hub is much narrower than the tread area to save weight and is the hub is offset which would not serve the needs for rollerblade wheels.

Another factor for development was the cargo capacity of 350 lb./24 cubic ft. The maximum transportable load dimensions determined as safe and stable on this cart were: 2 ft wide×3 ft long×4 ft height (height as measured from the frame bed surface). This is a far greater cubic capacity than even the largest 2-wheel luggage carts and exceeds many conventional 4-wheel carts that are not foldable or portable. In the past, guitarists and bassists transported their gear via 2-wheel luggage carts, flat 4-wheel furniture dollies, or hand carried their equipment piece by piece, all of which have numerous disadvantages. Today, many guitarists bring two to three separate guitars to gigs, not to mention an amplifier, pedal effects, guitar stands, music stands, sheet music cases, etc. It is practically impossible to move all this gear in one trip because the cubic foot load capacity of even the largest luggage carts is severely limited. Furthermore, many guitarists drive smaller cars which don't have room for a large 4-wheel cart in addition to all their other gear. Even if one could manage to mount all that gear on a 2-wheel luggage cart, a user would still have to balance it which would be dangerous. With the expandable frame, small storage size, and big load capacity of the present invention, all gear could easily be transported in one trip saving lots of energy and time for the user. Also, guitars and basses are fairly delicate and often transported in soft cases which must ride on top of the heavy amplifiers and other cases. With the 18" foldable side significantly shorter than the steering side, the long guitar cases could ride securely on top of the heavier gear and overhang the end of the cart (which kept the cart length to a minimum).

Additionally, the carts needed to transform into any of eight configurations within seconds to accommodate a much wider variety of equipment shapes and sizes. Some guitarists use both electric and acoustic guitars in all varieties of shapes and sizes. In addition, bassists use both electric and acoustic basses. Acoustic string basses are, in particular, very large and awkward to transport due to their large size and shape. Furthermore, other instrumentalists and soundmen would be using the carts at performance sites which meant that they had to move an even wider variety of musical equipment. The eight configurations were defined as:

- a "long hi-stacker" mode with the frame fully extended and both sides in a vertical position to transport the huge loads that could be stacked 2 ft. wide and 4 ft. high or more;
- a "long furniture dolly" configuration to move long lighting trusses, huge mixing consoles, or even long furniture that would require hanging over both ends of the cart or that would normally require two furniture dollies;
- a "long platform cart" configuration with an extended frame and one raised foldable side to move 54" or longer 88-note keyboard cases, etc. that would not fit between the upright folding sides and still allow the user to steer the cart easily;
- a "short platform cart" configuration with a retracted main frame and one upright side for use as an amp stand on stage (thereby occupying little stage space in cramped quarters) or to move tool boxes for sound men;
- a "short hi-stacker" configuration allowed carts to roll onto trains fully loaded with gear or move large water bottles. Additionally, guitarists could slide two soft-sided guitar cases over each raised side and put their amps and effects in the middle;
- a "short furniture dolly" allowing the cart to move extremely heavy equipment such as small pianos and Hammond organs that could be secured with straps affixed to the front axle holes;
- a "2-wheel handtruck" has a long nose like airport skycaps and stairclimbers to ergonomically move bulky speaker cabinets, amps, etc.; and
- a "storage/transport" configuration which allowed the cart to fit behind truck seats or inside large pick-up bed tool boxes.

With the prior art inventions, most of these configurations would not have been possible due to its significantly larger folded profile, interference from the longer foldable sides, and other factors. With any other cart, the greatest number of configurations possible would be one or two and some of those actually involved disassembly. In addition, numerous design improvements were made to the frame structure itself. No other cart that had ever been commercially available even came close to the versatility needed. Again, it must be noted that since this cart functions as a cohesive whole, changing any one design parameter usually requires a chain of other modifications to allow the cart to function correctly. The original cart by the present inventor would only transform into three configurations or modes and two of those did not work that well. It did not function effectively as a 2-wheel handtruck because the excessively long nose made it extremely awkward to use and it also placed too much stress on the clevis pins resulting in bending or breakage during heavy use. As a short furniture dolly it was also not effective originally. Moving heavy loads such as a piano would often bend the front axle and/or casters and be difficult to prevent slipping off. The front axle was strengthened approximately 25%, punched with strategic holes to reduce weight and accommodate securing straps, the casters were upgraded to a higher capacity with low weight, and a textured powdercoat resisted slippage when transporting heavy pianos or organs. In earlier versions, the cart could not be used effectively when the main frame was in an extended position because the wingbolts positioned beneath the main frame tubes could not be torqued tight enough by hand to maintain frame rigidity and were constantly falling out. Long furniture dolly mode or long platform cart modes tended to concentrate the load more toward the middle of the frame tubes weakest point due the alignment of the folded sides. This caused bending of the main frame tubes when the cart was loaded with heavy equipment.

Still another characteristic of the cart included function as an amplifier stand. Guitarists often like to tilt their amps back at 45 degrees via a professional amp stand so they can hear themselves better while performing. By fully compacting the main frame tubes and raising one side vertically, an amplifier could set on the cart and tilted back. Also, due to the cart's small profile, it was unobtrusive on stage and took up little space in cramped quarters. The non-skid surface on the frame bed surface prevented the amp from slipping off. This saved the performer the extra set-up time and hassle of bringing a separate amp stand. Functioning as an on-stage amplifier stand would be impossible for conventional 2-wheel or 4-wheel carts.

The present invention also developed because of concerns about weighing less than 18 lbs. Recently, airlines have, in general, implemented much greater size and weight restrictions on baggage. Additionally, carry-on objects cannot be very heavy if they ride in the overhead airline baggage compartment. Every possible weight saving procedure was done to the cart to meet this goal. Wheels and casters were reduced in weight, dimensions made smaller, steel tube omitted, foldable sides shortened, and the front axle was perforated with strategically positioned holes. In addition, be advised that the cart's load capacity of 350 lbs. was almost 20 times the cart weight. The front axle was designed with perforated holes that were strategically positioned to give structural strength, anchor bungee cords, and provide relatively low weight.

Shortening the foldable sides was another problem in the prior art. Shortening the foldable sides whereupon the cart could still function correctly was one of the greatest challenges facing the inventor. Without decreasing the length of the sides, there was no way that the cart could begin to meet the ultimate design goals with particular respect to airline regulations and weight restrictions. The shortest foldable side needed to be a maximum of about 18" to function effectively as a 2-wheel handtruck moving amplifiers and to reduce weight. This 18" foldable side, however, presented major problems to get it to function correctly. It was soon discovered that as the length of the foldable sides decreased they became stiffer and resistant to deflection which made the release cables increasingly harder to pull in order to fold the sides. Early prototype carts with shortened sides were inoperable because the sides were so stiff and inflexible that they would no longer disengage to fold and even the release cables would often break. Many different materials were tried in vain that would flex easier to allow shortening the sides. Aluminum tube cracked under the constant flexing. Thinner wall tubing bent under heavy loads. Tubing made of exotic materials was too expensive. Plastic wasn't strong enough. The present inventor's original invention, which compacted to a length of 36", had 33" foldable sides that deflected approximately 0.75" per side and required about 10 ft/lbs to pull the release cable so as to clear the L bracket while folding up or down. Sides shorter than 30" long drastically increased the effort required to pull the release cable to levels exceeding 20 ft. lbs. Initially it was thought that the original design would simply not function correctly with sides less than 30" long.

Ultimately, extensive testing revealed that three significant design modifications were necessary to solve this problem.

1. The clevis pins were shortened over 0.5" per side to reduce the amount of handle deflection to approximately 0.25" or less on each side.
2. The L bracket retainers were repositioned outward such that the handle would "seat" or overlap approximately 0.125" to 0.25" into each L bracket retaining area instead of the previous 0.5". (Experimentation revealed that this was the minimum overlap that would safely withstand the huge force exerted against the L bracket and components by the foldable handle when the cart was being pulled with a full load).
3. The L brackets were significantly strengthened and reinforced to accommodate a vastly greater stress load exerted by pushing against a much smaller surface area. (Early prototype testing resulted in total failure of the L brackets which would have been extremely dangerous for the user.) When the cart was pulled with a full load, the pounds per square inch stress load against the L brackets dramatically increased as the resting (overlap) area got smaller.

Also, other unexpected advantages occurred. The shortened clevis pins and shorter deflection reduced the amount of wobble or play the in the upraised sides because a smaller clevis pin hole could now be drilled in the foldable handles resulting in a tighter fit. Also in prior art carts, the sides were subject to bending at the clevis pin holes which was the weakest point. Reducing the clevis pin hole diameter strengthened the tube at that critical juncture. Once the problem of shortening the handles was solved, many other design innovations were possible.

The present invention also developed for effective functioning as a 2-wheel handtruck. With a shorter foldable side the cart functioned effectively as a two-wheel handtruck. When the handles were 33 inches long the cart was extremely awkward to use as a handtruck. Furthermore, the extended side length caused excessive pressure on the clevis pins resulting in frame damage as the foldable side pried up under various equipment.

The present invention further developed to reduce the amount of 20 mm left inside the 25 mm outer main frame bed tube during full extension and improve the wingbolt system to provide greater frame rigidity. When the cart frame bed is fully extended, there originally had been up to 8–10 inches of 20 mm telescoping tube left inside the 25 mm outer tube. The length of the 20 mm telescoping inner frame tubes partially dictated how small the cart could be compacted because the tube would run into the clevis pins housed at the end of the 25 mm tube when the frame was fully compacted. The present inventor found that during full frame extension, the length of internal square tube (13) left inside the outer square tube (12) could be reduced to 5.5" and still maintain frame rigidity by keeping the wingbolts much tighter than previously. However, this required replacing the 1.25" wingspan wingbolt with a wider plastic head wingbolt with a 1.75" wingspan which could be twisted much tighter by hand and a tensioner spring added to prevent loosening via vibration. (A wingspan greater than 1.75" would have interfered with the action of the swivel casters). This kept the telescoping tubes tightly jammed together when fully extended and provided much better frame rigidity. The now-shortened internal 20 mm tubes reduced the overall compacted/folded cart length 6% proportionately. (The internal 20 mm telescoping tubes would not hit the rear clevis pins thereby allowing cart to compact further in folded length.) An unexpected result was that "long furniture dolly" and "long platform cart" configurations were now possible. The long furniture dolly mode was comprised of the main frame fully extended and with both handles folded flat. The long platform cart mode was comprised of the main frame fully extended and with one foldable side up and one folded flat. These configurations allowed the cart to transport heavy items much longer than the actual frame and replaced the need for two shorter dollies. In these configurations, the position of the folded handles tends to concentrate the cargo weight toward the center of the cart which was the weakest point. The improved wingbolt system resisted the tendency for the folded handles to focus the weight of heavier equipment toward the center of the cart giving much better frame rigidity.

The prior art also required developing new casters that are visually appealing to musicians, 200 lb. + load capacity, very lightweight, economically priced, environmentally friendly (used less material), and would provide a quiet and cushioned ride without the heavier weight normally associated with solid rubber or urethane wheel casters. Carts often clattered noisily while transporting equipment over textured floors through hotels and restaurants which disturbed customers. In addition, carrying items such as delicate tube amps required casters that absorbed more shock. However, more durable, quieter, cushioned casters (which usually contained rubber or urethane tread) were physically heavier. Heavier casters mounted on smaller and lighter cart frames could make the cart unbalanced and cause it to topple over when used in upright storage configuration or as a 2-wheel handtruck. It also added overall undesirable weight to the frame of a cart that frequently had to be picked up and tossed into vehicles or on planes. To achieve smooth and quiet rolling characteristics but with low weight, the inventor designed a custom manufactured polymer hub with concentric hole design using a calculated maximum hole size (for structural strength) bonded to a soft 0.25" thick thermoplastic soft tread. To reduce weight, the caster wheel hub featured a concave shape resulting in the tread and outer wheel perimeter being significantly wider than the central hub. Furthermore, holes were punched and strategically positioned directly into the steel caster horn itself to further reduce caster weight yet retain structural strength. The entire caster unit rolled quiet and with the same shock absorption as rubber or urethane wheels, was 35% lighter than corresponding rubber or urethane casters, and tested out at 250 lb. continuous load capacity.

The foldable sides also needed to be easily replaceable by the customer. In the prior art, it was extremely difficult to remove or replace the foldable sides without specialized equipment. It was important to modify the overall frame design such that the foldable sides could be easily and quickly replaced in the field with modified sides that could accommodate bolt-on accessories such as guitar hangers, beverage holders, photography equipment mounts, headset hangers, extension cord hangers. The present invention allows the user to quickly and easily replace the foldable handles in the field with simply a pair of pliers. With after-market accessory sides, attachments could be also manufactured to the serve the specific needs of electricians, computer repair techs, photo/video technicians, cameramen, etc.

Finally, the economical price of the prior art required improvement. A smaller storage profile resulted in a smaller shipping box which means more cost efficient shipping in ocean-going containers. Less material costs were achieved by eliminating every inch of tubular steel possible. Less frame weight resulted in cheaper shipping costs.

It is the object of this invention to provide a 4-wheel convertible cart having means to fold and expand as to instantly transform into any of eight configurations thereby replacing the function of up to eight different cart types, these eight configurations are comprised of:

- a "long hi-stacker" mode with the frame fully extended and both sides in a vertical position in order to transport huge loads that could be stacked 2 ft. wide and 4 ft. high or more
- a "long furniture dolly" mode with the frame fully extended to a long position and both sides folded flat in order to move long lighting trusses, huge mixing consoles, or even long furniture that would require hanging over both ends of the cart or that would normally require two furniture dollies;
- a "long platform cart" mode with the frame fully extended and one foldable side raised to an upright position over the swivel casters in order to move 54" or longer 88-note keyboard cases, etc. that would not fit between the upright folding sides and still allow the user to steer the cart easily via one vertical side;
- a "short platform cart" mode with a fully retracted main frame and one foldable side over the swivel casters rotated vertically in order to use as an amp stand on stage (thereby occupying little stage space in cramped quarters) or to move tool boxes for sound men; and
- a "short hi-stacker" mode with a fully retracted main frame and two vertical sides in order to allow carts to roll onto trains fully loaded with gear or move large water bottles, wherein guitarists could slide two soft-sided guitar cases over each raised side and put their amps and effects in the middle;
- a "short furniture dolly" mode with the frame fully retracted and both sides raised to a vertical position in order to allow the cart to move extremely heavy equipment such as pianos and Hammond organs that could be secured with straps affixed to the front axle holes;
- a "2-wheel handtruck"mode where the main frame bed would be fully extended, and positioned 90 degrees to the ground with the larger wheels on the ground, one side over the casters folded down and the other side over the larger rear wheels locked in a horizontal position in order to act as an airport skycap with stairclimbers to ergonomically move bulky speaker cabinets, amps, bass drums, etc. via two wheels; and a "storage/transport" mode whereupon the frame would be fully retracted, both sides folded down, and the frame positioned at approximately 90 degrees to the ground with the larger to wheels touching the ground to allow the cart to fit behind truck seats or inside large pick-up bed tool boxes.

It is the object of this invention to provide a 4-wheel convertible cart having a cumulative dimension (length+width+depth) of approximately 45" to 50" so as to pass airline overhead baggage size restrictions.

It is the object of this invention to provide a 4-wheel convertible cart having an overall weight of less than 18 lb.

It is the object of this invention to provide a 4-wheel convertible cart having a cargo capacity of 350 lbs/24 cubic feet.

It is the object of this invention to provide a 4-wheel convertible cart having compacted/folded dimensions of approximately 26"×14"×7.5" and expanded/unfolded dimensions of 39"×14"×31" when measured as though the cart is contained within a tight-fitting rectangular box with parallel sides (measured at the widest points).

It is the object of this invention to provide a 4-wheel convertible cart having two rotatable sides, one of said sides which will lock in a vertical position and be used to steer the cart and having a length of approximately 31" from the floor and the other of sides significantly shorter and ranging from 8" to 24" in length to facilitate moving amps as a 2-wheel handtruck, transport long equipment, and reduce weight.

It is the object of this invention to provide a 4-wheel convertible cart having a rear wheel system featuring an offset polymer hub having concentric holes bonded to a dome shaped soft tread with approximately uniform 4 mm tread thickness whereby the wheel may be positioned closer to the main frame tubes than conventional wheels in order to reduce side to side wheelbase dimensions to 14", retain mainframe width of 11", provide a unique appearance, and be lightweight.

It is the object of this invention to provide a 4-wheel convertible cart having swivel casters featuring a polymer hub with concentric holes bonded to a thermoplastic (soft) tread and metal horn (frame) featuring strategically punched holes whereby to maintain structural integrity, light weight, unique appearance, and quiet rolling.

It is the object of this invention to provide a 4-wheel convertible cart having stairclimbers that are positioned flush with the inside edge of the outer main frame tubes as a means to accommodate said offset polymer hub wheel system resulting in 14" wheelbase width while maintaining 11" frame bed width.

It is the object of this invention to provide a 4-wheel convertible cart having two foldable sides, one of which will be approximately 8" to 24" in length and will be easily rotatable (require less than 10 ft. lb. of force) from a horizontal to a vertical position and vice versa.

It is the object of this invention to provide a 4-wheel convertible cart with two foldable sides that has spring-loaded threaded wingbolts with an approximately 1.75" wingspan positioned beneath the main frame tubes that can be tightened firmly enough by hand so as to prevent loosening of said wingbolts during rugged use and maintain frame rigidity when extended.

It is the object of this invention to provide a 4-wheel convertible cart having two foldable sides that can quickly and easily be replaced in the field without specialized equipment.

It is the object of this invention to provide a 4-wheel convertible cart having a front axle with strategically positioned holes whereby to reduce weight, maintain structural integrity, provide a unique appearance, and accommodate bungee cords.

It is the object of this invention to provide a 4-wheel convertible cart that provides a frame which expands to approximately six times its compacted size when measured at the widest points whereby to significantly increase its efficiency in storage size vs. load capacity.

It is the object of this invention to provide a 4-wheel convertible cart having approximately the same cubic foot load capacity as conventional dual trucks but which has approximately 1/6 the storage size as measured in cubic inches.

It is the object of this invention to provide a 4-wheel convertible cart having means to easily rotate a foldable side less than 24" in length in a vertical or horizontal position.

These and other objects and advantages of the present invention will become apparent from a reading of the attached specification and appended claims.

BRIEF SUMMARY OF THE INVENTION

The present invention is a multi-functional cart for transporting objects including a frame; a first handle connected to the frame adjacent a first end of the frame; a second handle connected to the frame adjacent a second end of the frame, a first pair of wheels connected to the frame adjacent the first end of the frame, and a second pair of wheels connected to the frame adjacent the second end, each of the second pair of wheels being a caster rotatably interconnected to the frame. The first and second handles selectively movable between a first position perpendicular to the frame and a second position generally coplanar within the frame. The first pair of wheels are rotatably mounted to a tubular axle.

The first handle has a length ranging between 8 inches and 24 inches as measured from a bottom of the first pair of wheels upwardly when the first handle is in the first position. The second handle has a length of at least 39 inches as measured from a bottom of the second pair of wheels upwardly when the second handle is in the first position. The frame, the first and second handles and the first and second pair of wheels occupy a volume of less than 50 cubic inches and have a total weight of less than 18 pounds.

The multi-functional cart of the present invention has a frame with a first frame member and a second frame member in telescopic relationship to each other. The frame has a generally rectangular configuration and can be fixable in either a telescoped position or a retracted position. By changing the frame between the telescoped position and the retracted position and changing the first and second handles between the first and second positions, the multi-functional cart can transform into eight different configurations, such as "long-hi stacker", "long furniture dolly", "long platform cart", "short-hi stacker", "short furniture dolly", "short platform cart", "2-wheel handtruck" and "storage/transport" configurations.

In the multi-functional cart of the present invention, each of the first pair of wheels is a hub formed of a polymeric material with a plurality of concentric holes around the central aperture. The hub also has a concave shape and a thermoplastic tread bonded thereto. The thermoplastic tread has a domed configuration and uniform thickness.

Also, each of the second pair of wheels includes a caster frame pivotally connected to the frame and extending downwardly therefrom, and a caster rotatably mounted within the caster frame. The caster has a thermoplastic tread bonded to a polymeric caster hub, and the polymeric caster hub has a plurality of concentrically arranged holes formed therein. The caster hub has an outer circumference width greater than an inner circumference thereof.

In the multi-functional cart of the present invention, each of the second pair of wheels connected to the frame adjacent the second end may also include a caster rotatably interconnected to the frame by a second tubular axle. The second pair of wheels is rotatably mounted to a second tubular axle. This second tubular axle is comprised of a metal or plastic tube and has a plurality of cord holes formed therein. The cord holes are used to attached cords to the second tubular axle.

BRIEF DESCRIPTION OF THE VIEW OF THE DRAWING

DETAILED DESCRIPTION OF THE INVENTION

Figure 1:
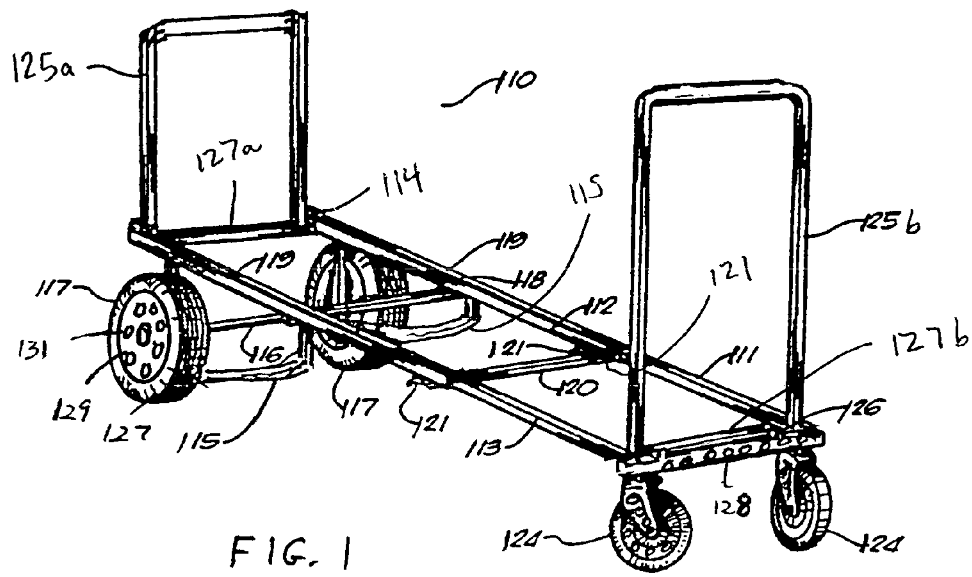
FIG. 1 is an upper perspective view of the present invention showing the first and second handles in a first position perpendicular to the frame.

With reference to the drawings, FIG. 1 illustrates the multi-functional cart 110 of the present invention. The multi-functional convertible transport cart 110 is particularly configured to be of a relatively small size and can be folded so that the width is no more than eleven inches. The cart 110 is especially adapted for converting into configurations for different functions. The frame 111 is comprised of slidably cooperating U-shaped tubing divided into two sections. The frame 111 of cart 110 is made of preferably a mild square tubular steel which is structurally light. The main frame bed 112 and the telescoping frame section are provided so as to form the frame 111. Telescoping frame section 113 slidably engages the main frame 112. The main frame 112 has a generally rectangular configuration and is fixable in either a telescoped or retracted position. The frame 111 may be welded or bonded by mechanical means such as by bolts 114. The main frame bed 112 includes a non-skid surface 119 for reduced possibility of accidental slipping of equipment.

A stair climber attachment 115 is secured directly to the bottom of the main frame bed 112. The stair climber attachment 115 includes tubular axle 116 for supporting a first pair of wheels 117 and also serving as a lateral support bar 118 for bracing the main frame bed 112. Another lateral support bar 120 is placed where the telescoping frame section 113 and the main frame bed 112 interconnect. This reinforces the mid-section of the frame 111. Additional reinforcement is provided by the use of heavy duty thumbnuts 121. The thumbnuts 121 are threadedly received on the underside of main frame bed 112 on each side of the frame bed. A single thumbnut 121 could also be used for securing a frame section in a desired position. Thumbnuts 121 can be rotated so as to move in abutment with the telescoping frame section 113. This serves to lock the telescoping frame section 113 in position relative to the main frame bed 112. The thumbnuts 121 are located on the underside of the main frame bed 112 so as to avoid snagging of equipment or objects located on the top or sides of the cart 110. The threaded thumbnuts 121 have a diameter of 1.75 inches. A tensioner spring can be interposed between each of the thumbnuts 121 and the frame 111.

Inverted U-shaped handles 125*a* and 125*b* are symmetrically placed on opposite ends of frame 111. The handles 125*a* and 125*b* are releasably attached to the frame by suitable hinges 126 for ease in collapsing handles 125*a* and 125*b*. The handles 125*a* and 125*b* are also locked into place by suitable mechanical means such as was described in U.S. Pat. No. 5,476,282, incorporated herein by reference.

Figure 2:
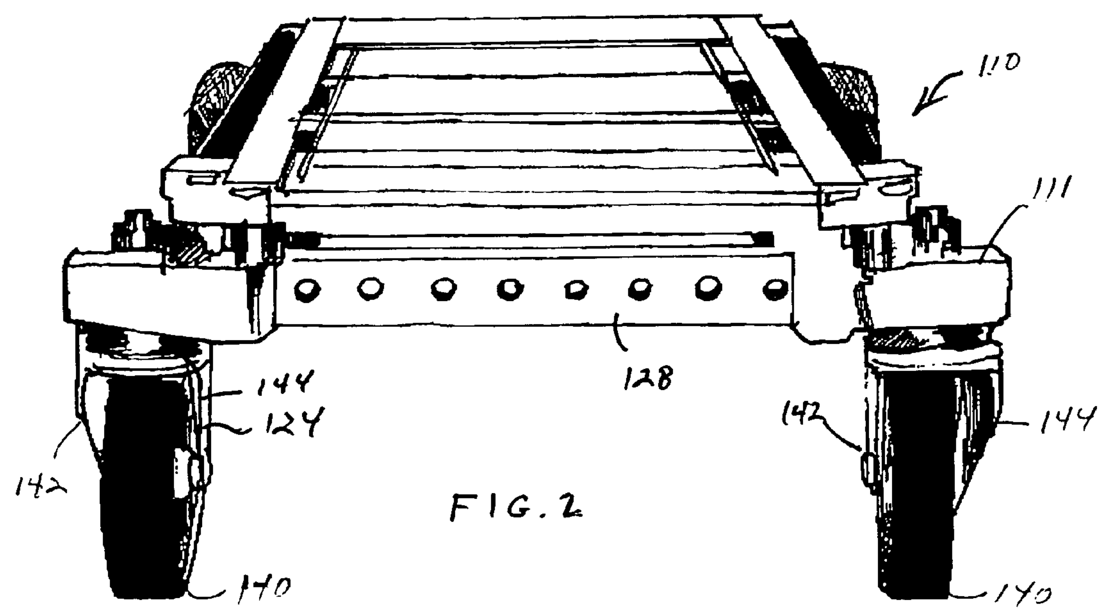
FIG. 2 is an upper end perspective view of the present invention showing the first and second handles in a second position generally coplanar with the frame.

The handles 125*a* and 125*b* are supported on respective axle members 127. Handles 125*a* and 125*b* can rotate about axles 127 from a first position to a second position. The first position of handles 125*a* and 125*b* is illustrated in FIG. 1. The handles 125*a* and 125*b* are in a position perpendicular to the frame 111 of cart 110. The second position of handles 125*a* and 125*b* is shown in FIG. 2 in which the handles 125*a* and 125*b* are rotated about axles 127 so as to assume a position parallel to and aligned with the frame 111. The second position is generally coplanar with the frame 111. The ability to rotate the handles 125*a* and 125*b* about axles 127 enhances the capabilities of the present invention. A specialized mechanism is provided for locking the handles in proper position.

The first handle 125*a* has a length ranging between 8 inches and 24 inches as measured from a bottom of the first pair of wheels 117 upwardly when the first handle 125*a* is in the first position. The second handle 125*b* has a length of at least 39 inches as measured from a bottom of the second pair of wheels 124 upwardly when the second handle 125*b* is in the first position. The frame 111, the first and second handles 125*a* and 125*b* and the first and second pair of wheels 117, 124 occupy a volume of less than 50 cubic inches and have a total weight of less than 18 pounds.

The use of the mild durable square tubular steel material is, by structural design, light enough in weight to be manually lifted onto a truck or into an automobile trunk. It is also structurally sound enough to withstand and support 350 pounds of equipment. The overall empty weight of the cart 110 should not exceed forty pounds. The square tubular steel is preferred because it allows for a larger surface area on the frame 111 than does rounded tubing. Non-skid adhesive tape 119, or the like, is applied to the top surface of the main frame bed 112 so as to reduce the possibility of equipment slipping from the cart.

The stair climbing device 115 is attached to the bottom of the cart 110 to aid in ascending and descending stairs. The first plurality of wheels 117 are located at the bottom end of the cart 110 and use part of the stair climbing device as an axle. The second pair of wheels 124 are located on the opposite end of the cart 110 and are preferably pivoting caster wheels for ease and direction change and maneuverability.

According to the present invention, the cart 110 with a main frame 112 in the retracted position, the first handle 125*a* selectively locked in the second position, the second handle 125*b* selectively locked in the second position, and the first and second pair of wheels 117, 124 have dimensions of 26"×14.25"×7.5". The cart 110 with a main frame 112 in the telescoped position, the first handle 125*a* selectively locked in the first position, the second handle 126*b* selectively locked in the first position, and the first and second pair of wheels 117, 124 have dimensions of 39"×14"×31".

Figure 3:
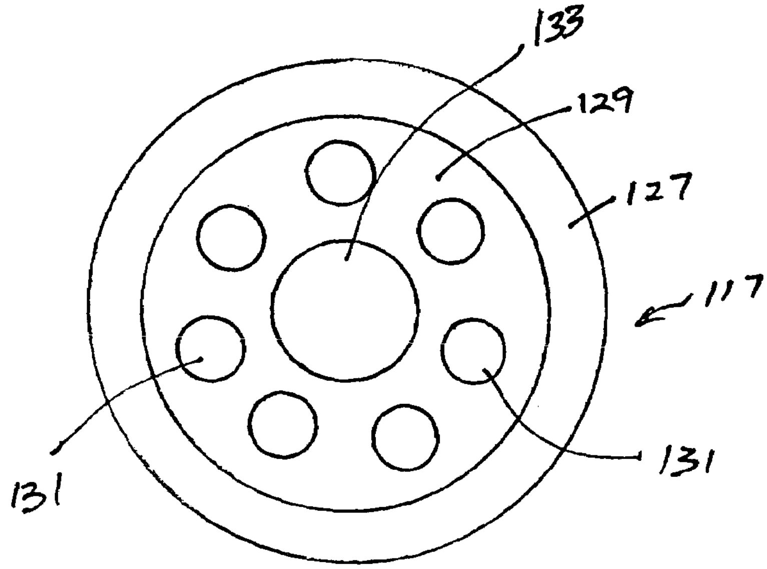
FIG. 3 is an isolated side view of the first pair of wheels of the present invention.
Figure 4:
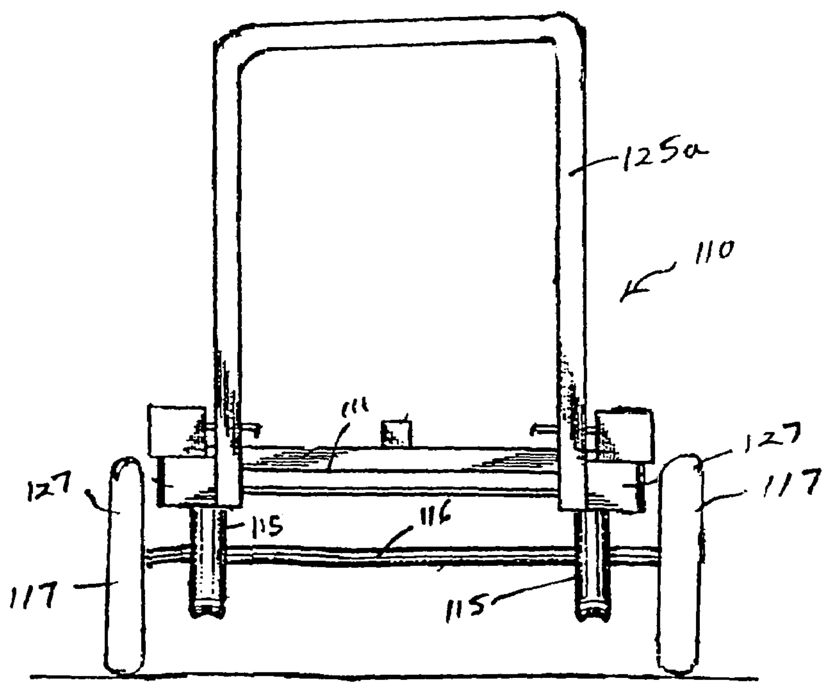
FIG. 4 is an end view of the first pair of wheels shown in FIG. 3, with the first handle in the first position perpendicular to the frame.

As shown in FIG. 3, the multi-functional cart 110 of the present invention can have a first pair of wheels 117 that are not pneumatic wheels but includes a thermoplastic tread 127 mounted to a polymeric hub 129. The polymeric hub 129 includes a plurality of holes 131 formed therein so as to minimize the weight of the polymeric hub 129. The holes 131 are concentrically arranged around a central aperture 133. A central aperture 133 is formed therein so as to accommodate the roller bearings for joining the wheels 117 with the tubular axle 116. The holes are radially spaced around the central aperture 133. The use of the thermoplastic tread 127 on the polymeric hub 129 also minimizes the noise associated with the respective wheels 117.

In the design of the multi-functional cart 110, it was important to be able to configure the wheels 117 so that they could accommodate the loads while being spaced apart by no more than eleven inches. As a result, the thermoplastic tread 127 of the wheels 117 has a domed outer surface. As a result, the wheels 117 can be placed closer to the side frames 119 of the cart 110. This positioning is further accomplished by moving the stair climber frame members 115 to a position extending directly below the bottom of the side frames 119. As such, the outer surface of the wheels 117 will not contact the frame 119 but will be positioned as close as possible. The tubular axle 116 will extend between the wheels 117 below the frame 111.

Figure 5:
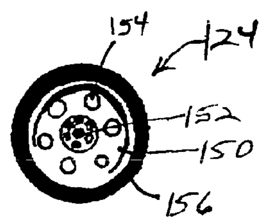
FIG. 5 is an isolated plan view of the caster of the present invention.

FIG. 5 shows an isolated view of a single caster wheel 124 of the present invention. Caster wheel 124 has a polymeric hub 150 having bearings formed in a central aperture 152 thereof. A plurality of concentrically arranged holes 154 are formed in spaced relationship extending radially around the central aperture 152. The outer circumference width of the caster wheel 124 is greater than the inner circumference. The polymeric hub 150 is generally concave. The incorporation of the holes 154 minimizes the weight of the polymeric hub 150. The use of the polymer material for the hub 150, in place of the steel material of the earlier form of the present invention, minimizes the weight associated with the respective casters 124. A thermoplastic tread 156 is bonded around the periphery of the hub 150. As such, the formation of the casters 124 can be carried out in a very convenient and easy manner. Importantly, the use of the thermoplastic tread 156 around the hub 150 will minimize the noise produced by the casters 124 when the cart 110 is rolled along a surface.

Figure 6:
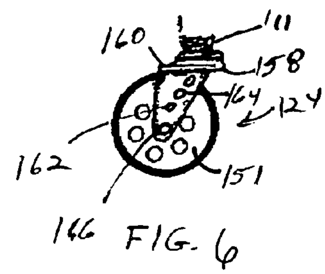
FIG. 6 shows another isolated plan view of the caster of FIG. 5 and the caster frame as used in the present invention.

FIG. 6 shows a detailed view on how the caster 124 is connected to the frame 111. The caster 124 includes the wheel 151 which is rotatably mounted within the caster frame 158. The caster frame includes a flat surface 160 which is pivotally mounted to the frame 111 and extends in generally parallel relationship to the frame 111. A wing member 162 extends transversely downwardly from one side of the flat surface 160. The wing member 162 has a plurality of holes 164 formed therein and therethrough. The holes 164 extend downwardly from the flat surface 160. The caster wheel 151 is mounted by a rivet 166 to the caster frame 158. The use of the hole 164 minimizes the weight associated with the caster frame 158. The use of the holes 164 also provides a desirable aesthetic appearance to the configuration of the caster frame 158.

Figure 7:
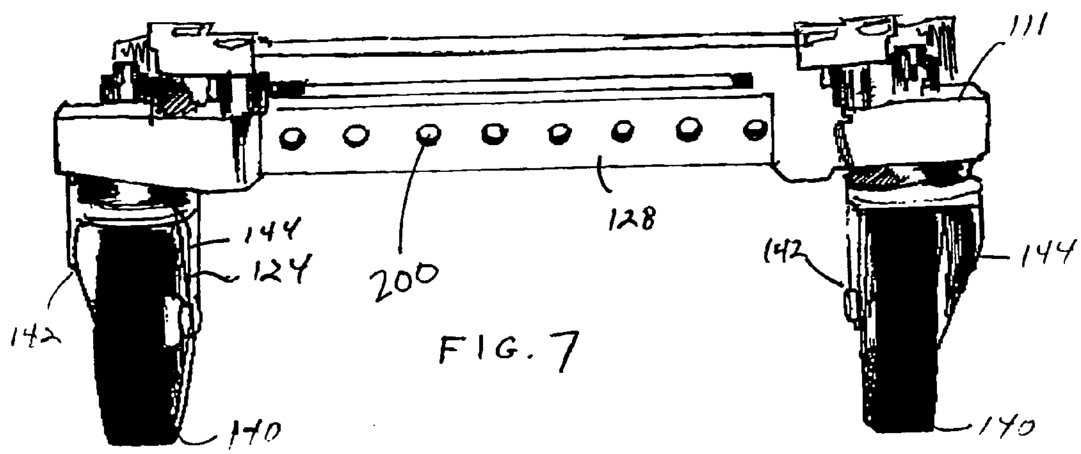
FIG. 7 is an isolated upper end perspective view of the second pair of wheels attached to a second tubular axle with cord holes.

The embodiment, shown in FIG. 7, uses front casters 124 having a similar configuration to that described in FIGS. 5 and 6. A front frame section 126 extends between the casters 124 as the second pair of wheels. The front frame section 126 has a second tubular axle 128 fixedly attached thereto for the second pair of wheels. It can be seen that the casters 124 include caster wheels 140 that are rotatably mounted between the wing members 142 and 144. Each of the wing members 142 and 144 will have holes formed therethrough in the manner previously described for FIG. 6. The second tubular axle 128 is comprised of a metal or plastic tube. The tube may have a circular cross-section or a polygonal cross-section. There are holes 200 formed in the second tubular axle 128 so as to minimize the weight of this forward frame section. The holes 200 also function as cord holes, anchoring detachable elastic cords.

FIGS. 8A–8G show the various configurations to which the multi-functional cart can be adapted. The cart has the previously described structures, including first and second handles movable between a first position perpendicular to the frame means and a second position generally coplanar with the frame, a first and second pair of wheels, and the frame comprised of a first frame member and a second frame member in telescopic relation to each other. The frame has a generally rectangular configuration and is fixable in either a telescoped position or a retracted position.

Figure 8A:
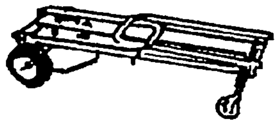
FIGS. 8A–8G show the perspective views of the various configurations into which the present invention can be assembled.

FIG. 8A shows a "long furniture dolly" configuration having the first handle selectively locked in the second position, the second handle selectively locked in the second position, and the frame fixed in the telescoped position.

Figure 8D:
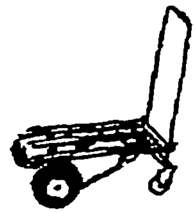
Figure 8B:
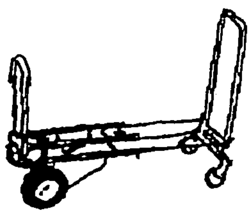

FIG. 8B shows a "long-hi stacker" configuration having the first handle selectively locked in the first position, the second handle selectively locked in the first position, and the frame fixed in the telescoped position.

Figure 8E:
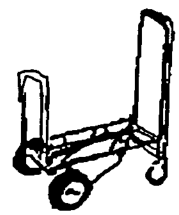
Figure 8C:
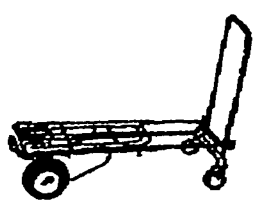

FIG. 8C shows a "long platform cart" configuration having the first handle selectively locked in the second position, the second handle selectively locked in the first position, and the frame fixed in the telescoped position.

FIG. 8D shows a "short platform cart" configuration having the first handle selectively locked in the second position, the second handle selectively locked in the first position, and the frame fixed in the retracted position.

FIG. 8E shows a "short-hi stacker" configuration having the first handle selectively locked in the first position, the second handle selectively locked in the first position, and the frame fixed in the retracted position.

Figure 8F:
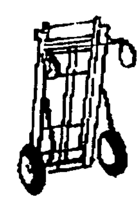

FIG. 8F shows a "short furniture dolly" configuration having the first handle selectively locked in the second position, the second handle selectively locked in the second position, and the frame fixed in the retracted position.

Figure 8G:
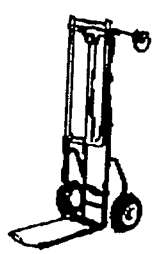

FIG. 8G shows a "2-wheel handtruck" configuration having the first handle selectively locked in the first position, the second handle selectively locked in the second position, and the frame fixed in the telescoped position and rotated 90° on the first axle.

FIG. 8F also shows a "storage/transport" configuration having the first handle selectively locked in the second position, the second handle selectively locked in the second position, and the frame fixed in the retracted position. The frame is rotated 90° on the first pair of wheels.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A multi-functional cart for transporting objects comprising:

a frame;

a first handle connected to said frame adjacent a first end of said frame;

a second handle connected to said frame adjacent a second end of said frame, said first handle selectively movable between a first position perpendicular to said frame and a second position generally coplanar within said frame, said frame having a first axle member in engagement with said first handle, said frame having a second axle member in engagement with said second handle, said first handle rotatable between said first and second positions about said first axle member, said second handle rotatable between said first and second positions about said second axle member;

a first pair of wheels connected to said frame adjacent said first end of said frame, said first pair of wheels being rotatably mounted to a tubular axle; and a second pair of wheels connected to said frame adjacent said second end, each of said second pair of wheels being a caster rotatably interconnected to said frame, said first handle having a length ranging between 8 inches and 24 inches as measured from a bottom of said first pair of wheels upwardly when said first handle is in said first position, said second handle having a length of at least 39 inches as measured from a bottom of said second pair of wheels upwardly when said second handle is in said first position, said frame, said first and second handles and said first and second pair of wheels occupying a volume of less than 50 cubic inches, and said frame, said first and second handles and said first and second pair of wheels having a total weight of less than 18 pounds, each of said first pair of wheels having a pneumatic tire affixed around a hub, said hub being comprised of a polymeric material having a central aperture, said central aperture receiving roller bearings therein, said roller bearings receiving said tubular axle therein, said tubular axle having a pair of holes formed therein, said pair of holes receiving a cotter pin therein at an end of said tubular axle outwardly of the wheel.

2. The cart of claim 1, each of said first pair of wheels having a thermoplastic tread bonded to a polymeric hub.

3. The cart of claim 2, said polymeric hub having a central aperture therein, said central aperture receiving roller bearings therein, said roller bearings receiving said tubular axle therein, said polymeric hub having a plurality of holes formed therein and therethrough and extending in spaced radial relationship around said central aperture.

4. The cart of claim 1, each of said second pair of wheels having a caster frame pivotally connected to said frame and extending downwardly therefrom, said caster being rotatably mounted within said caster frame.

5. The cart of claim 1, said caster frame comprising:

a generally flat surface in parallel relationship with said frame, said flat surface being pivotally connected to said frame;

a first wing member extending transversely outwardly from said flat surface on one side of said flat surface; and a second wing member extending transversely outwardly from said flat surface on an opposite side of said flat surface in parallel relationship to said first wing member, said caster being rotatably mounted between said first and second wing members.

6. A multi-functional cart for transporting objects comprising:

a frame;

a first handle connected to said frame adjacent a first end of said frame;

a second handle connected to said frame adjacent a second end of said frame, said first handle selectively movable between a first position perpendicular to said frame and a second position generally coplanar within said frame, said frame having a first axle member in engagement with said first handle, said frame having a second axle member in engagement with said second handle, said first handle rotatable between said first and second positions about said first axle member, said second handle rotatable between said first and second positions about said second axle member;

a first pair of wheels connected to said frame adjacent said first end of said frame, said first pair of wheels being rotatably mounted to a tubular axle; and a second pair of wheels connected to said frame adjacent said second end, each of said second pair of wheels being a caster rotatably interconnected to said frame, said first handle having a length ranging between 8 inches and 24 inches as measured from a bottom of said first pair of wheels upwardly when said first handle is in said first position, said second handle having a length of at least 39 inches as measured from a bottom of said second pair of wheels upwardly when said second handle is in said first position, said frame, said first and second handles and said first and second pair of wheels occupying a volume of less than 50 cubic inches, and said frame, said first and second handles and said first and second pair of wheels having a total weight of less than 18 pounds, each of said second pair of wheels having a caster frame pivotally connected to said frame and extending downwardly therefrom, said caster being rotatably mounted within said caster frame, said caster frame comprising:

a generally flat surface in parallel relationship with said frame, said flat surface being pivotally connected to said frame;

a first wing member extending transversely outwardly from said flat surface on one side of said flat surface; and a second wing member extending transversely outwardly from said flat surface on an opposite side of said flat surface in parallel relationship to said first wing member, said caster being rotatably mounted between said first and second wing members, each of said first and second wing members having a plurality of holes formed therein and therethrough in spaced parallel relationship downwardly from said flat surface.

7. The cart of claim 6, said caster having a thermoplastic tread bonded to a polymeric hub, said polymeric hub having a plurality of holes formed therein and therethrough and extending in spaced radial relationship around said caster.

8. The cart of claim 6, said frame having a first frame member and a second frame member in telescopic relationship to each other, said frame having a generally rectangular configuration, said frame being fixable in either a telescoped position or a retracted position.

9. The cart of claim 8, wherein said first frame member has a plurality of threaded thumbnuts having a diameter of 1.75 inches, said thumbnuts extending through said first and second frame members and fixedly engaging said first and second frame members, and each of said thumbnuts having a tensioner spring interposed between each of said thumbnuts and said frame.

10. The cart of claim 8, wherein said frame in said retracted position, said first handle being selectively locked in said second position, said second handle being selectively locked in said second position, said first and second pair of wheels have a dimension of 26"×14.25"×7.5"; and wherein said frame in said telescoped position, said first handle being selectively locked in said first position, said second handle being selectively locked in said first position, said first and second pair of wheels have a dimension of 39"×14"×31".

11. A multi-functional cart for transporting objects comprising:

a frame;

a first handle connected to said frame adjacent a first end of said frame;

a second handle connected to said frame adjacent a second end of said frame, said first handle selectively movable between a first position perpendicular to said frame and a second position generally coplanar within said frame, said frame having a first axle member in engagement with said first handle, said frame having a second axle member in engagement with said second handle, said first handle rotatable between said first and second positions about said first axle member, said second handle rotatable between said first and second positions about said second axle member;

a first pair of wheels connected to said frame adjacent said first end of said frame, said first pair of wheels being rotatably mounted to a tubular axle; and a second pair of wheels connected to said frame adjacent said second end, each of said second pair of wheels being a caster rotatably interconnected to said frame, said first handle having a length ranging between 8 inches and 24 inches as measured from a bottom of said first pair of wheels upwardly when said first handle is in said first position, said second handle having a length of at least 39 inches as measured from a bottom of said second pair of wheels upwardly when said second handle is in said first position, said frame, said first and second handles and said first and second pair of wheels occupying a volume of less than 50 cubic inches, and said frame, said first and second handles and said first and second pair of wheels having a total weight of less than 18 pounds, said second frame member having an end surface extending between said second pair of wheels, said end surface having a plurality of holes formed therein and therethrough, said plurality of holes being in spaced relationship to each other and having a colinear central axis.

12. The cart of claim 11, said first frame member having a first stair climber frame member affixed directly to and extending directly outwardly from an underside of one side of said first frame member, said first frame member having a second stair climber frame member affixed directly to and extending directly outwardly from an underside of an opposite side of said first frame member, said second stair climber frame being in parallel relationship to said first stair climber frame, wherein said first and second stair climber frames are welded flush to respective inside edges of said first frame member.

13. The cart of claim 12, said first pair of wheels being positioned adjacent respective outer surfaces of said first and second stair climber frames.

* * * * *